H. H. CUMMINGS.
COUNTER AND INDICATOR.
APPLICATION FILED MAR. 26, 1917.
1,363,846.
Patented Dec. 28, 1920.
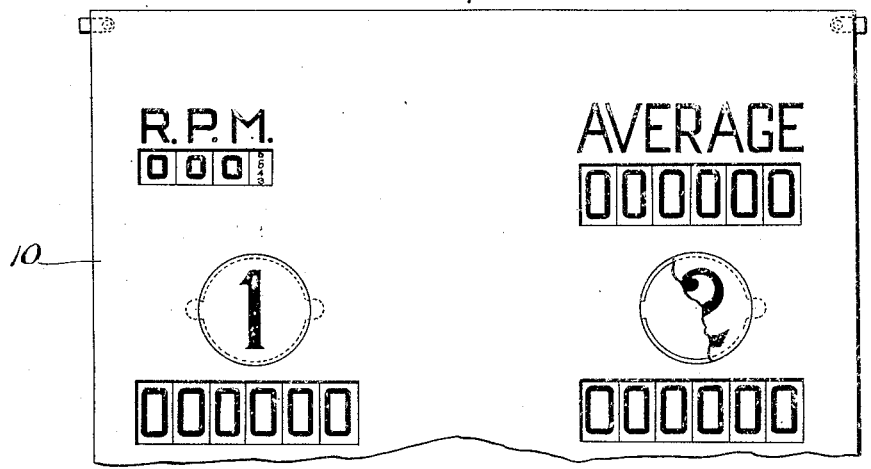
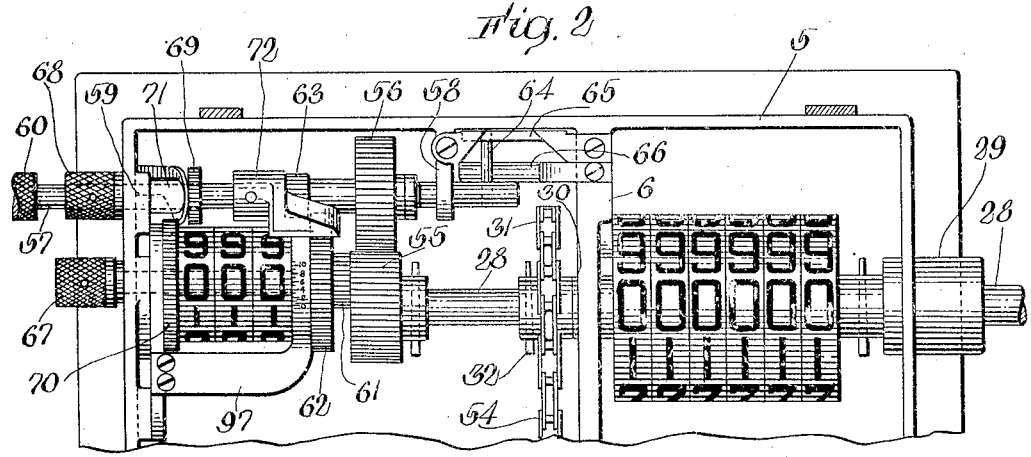
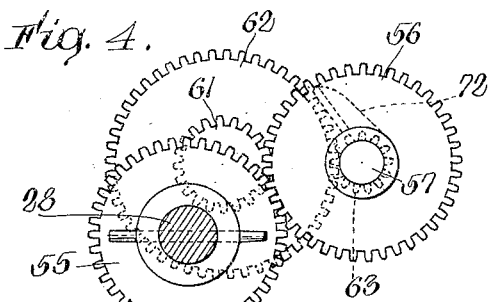
Inventor:
Henry H. Cummings,
by James R. Hodder
Attorney.

UNITED STATES PATENT OFFICE.

HENRY H. CUMMINGS, OF BOSTON, MASSACHUSETTS.

COUNTER AND INDICATOR.

1,363,846.  Specification of Letters Patent.  Patented Dec. 28, 1920.

Original application filed August 28, 1912, Serial No. 717,453. Divided and this application filed March 26, 1917. Serial No. 157,352.

*To all whom it may concern:*

Be it known that I, HENRY H. CUMMINGS, a citizen of the United States, and resident of Boston, county of Suffolk, and State of Massachusetts, have invented an Improvement in Counters and Indicators, of which the following description, in connection with the accompanying drawings, is a specification, like letters on the drawings representing like parts.

The counting and indicating of the speed of a moving part, such for example as the revolutions per minute of a rotating shaft, is the subject of my present application, which application is a divisional of my prior application on revolution counters, Serial No. 717,453, filed August 28, 1912, now Patent No. 1,223,039 dated Apl. 17, 1917.

The present application is directed to my novel mechanism for counting and indicating the speed of a shaft or the number of revolutions per minute in a period less than one minute, if desired, or the average revolutions per minute for a period of five minutes or more, and which may be thrown into operation at any instant, and quickly reset for a subsequent indication. As explained in my patent, above identified, it is extremely important in indicators such as therein explained, to show means which will count and indicate the number of revolutions per minute during as brief a time as practicable, such as during a quarter of a minute, thirty seconds, or other predetermined space of time, and which mechanism is always ready to be thrown into operation to count and indicate the R. P. M. of a shaft. Also it is often desirable to have the revolutions per minute indications taken from the average revolutions covering many minutes, or many times as many revolutions as indicated. These features of my counter and indicator, as well as the resetting mechanism, may be operatively connected with the moving part of any machine, or with the resultant counter from several machines, as shown in the average counter and indicator of my said prior patent.

Referring to the drawings,

Figure 1 is a fragmentary view of the cover or casing inclosing the indicator mechanism.

Fig. 2 is a view of the counter and indicator connected with a source of power consisting in a revolution counter which is continuously rotating.

Fig. 3 is a detailed view partly in cross section of the operating mechanism.

Fig. 4 is an enlarged view of the gear wheels, and

Fig. 5 is a fragmentary view showing the spring locking device to engage and disengage the indicator from operative connection with the actuating gears.

The application of my counter and resetting mechanism to the average rotation counter of a plurality or set of engines and counters therefor, is shown in my said patent and I will, therefore, use the same reference characters for corresponding parts in the following description, as that in the said prior patent, reference thereto being hereby made for further explanation.

It will be understood that the counter which is of well known type such as illustrated in Figs. 3 and 4 of my said patent may be and preferably will be, inclosed within a box or receptacle 5 which the cover 10 incloses. If desired, this box may inclose merely the counter to be described with the extending shaft 28 operatively connected to the shaft or mechanism receiving the motion to be counted. In the particular form herein shown the sprocket wheel 31 with its hub secured to the shaft 28 by a pin 32, receives its motion from a sprocket chain 54, although any other connection with the shaft 28 may be utilized, as will be readily understood. Rotation of the shaft 28 and the speed or revolutions per minute of the shaft 28 are to be registered by my counter and indicator to be described.

Pinned to the shaft 28 is a gear 55 in mesh with a coöperating gear 56 mounted on a sliding rod 57. This rod is suitably journaled in a bracket 58 and a sleeve 59 in the bearing in the side of the box 5 extending beyond said box and carrying a thumb nut 60. Mounted adjacent to the rod is an indicator comprising a series of indicating wheels generally similar to the counter described in said patent and mounted on a stud secured to the side of the box 5. The first or driving ring of this indicator carries two gears 61 and 62 suitably keyed thereon. The gear wheel 61 being arranged to be in mesh with the gear 56 on the rod 57 when said rod is manipulated to slide the gear 56 and 61 into operative connection. The gear 56 is of proportionate width so as to be in engagement with the gear 55 at all times within the limit of movement of the rod 57, and the rotation of the shaft 28 will be transmitted through said gears 55, 56 and 61 to the indicator just mentioned, the wheel 61 being of such proportion to the gears 56 and 55 (which latter are of equal diameter), so that the indicator will be rotated at twice the speed of rotation of the shaft 28 and in the same direction therewith. Therefore this indicator will show, in thirty seconds, the number of average revolutions per minute of the shaft 28. In order to also determine the number of revolutions per minute for a greater length of time than one minute, as for example in five minutes, the rod 57 carries a gear 63 adapted to engage the gear wheel 62 when the rod 57 is moved or slid along so as to bring the wheel 62 into mesh with the wheel 63. These wheels are of proportion so that five revolutions of the shaft 28 will rotate the gear 62 and consequently the indicator, during one revolution and therefore the average number of revolutions for one minute during a period of five minutes will be counted by the indicator showing what is the average revolution per minute during the said period of five minutes time. Any predetermined ratio of time may be counted by providing properly proportioned gear wheels other than merely for thirty seconds, and for a five minute interval, although these two are the ones I have found to be most desired in the present uses to which my invention has been applied. In order to hold the rod 57 where moved so that the desired gear will be actuating the indicator I have provided a simple and efficient spring locking device illustrated in Figs. 2 and 5. The rod 57 has a transversely extending pin 64 near its inner end which extends into a notched slot in the rack 65 secured to the side of the box 5. A spring 66 normally presses against the pin 64 to hold it upwardly into engagement with the walls of said slot if the pin is out of the notch. When the rod 57 is slid so that the gears 56 and 61 are in mesh, then the pin 64 will be at one end of the slot in said member 65, when gears 63 and 62 are in mesh the pin 64 must be at the other end of said slot and when said pin is in the notch the indicator is disengaged from operative connection with the gears on the rod 57 and may be reset. Any suitable resetting device may be employed, but preferably I use the novel form as herein shown.

The average counter and indicator for the revolutions per minute will preferably comprise only three indicating rings as one to a thousand revolutions per minute may be counted on three rings and this speed is seldom exceeded in propelling shafts, although of course any number of revolutions per minute may be counted by providing a proper number of rings. In order to reset the devices the first or driving ring may be quickly turned through the thumb piece 67 projecting outside the box 5 and keyed to the supporting shaft of said indicator which shaft has the wheels 61, 62 on its inner end. In order to reset the third indicator ring I have arranged the sleeve 59 with a thumb piece 68 on its outer end and the gear wheel 69 on its inner end which is arranged to be meshed with a gear wheel 70 secured to said third indicating ring so that manipulation of the thumb piece 68 will rotate the third ring of the indicator. A spring 71 secured to the side of the box 5 normally throws this resetting mechanism out of mesh with the third ring of the indicator. If desired, a brake 72 may be fixed on the rod 57 so positioned on the rod 57 that it will bear against the gear wheel 62 when the pin 64 is forced into the notch in the member 65 and hence stop the rotation of the indicator since the actuating mechanism is disconnected therewith.

The operation of the counter and indicator as well as of the resetting device, will be clearly understood from the foregoing description. At any time during the continuous rotation of the shaft 28 the operator may throw the counter into operative connection therewith and in thirty seconds,—or any predetermined period of time less than a minute,—the indicator will show the actual revolutions per minute of the shaft 28, when the apparatus will be thrown out and may be instantly reset to zero ready for another reading at any time the observer desires.

My invention is further described and defined in the form of a claim as follows:

In a rotation counter, the combination with a rotatable member whose rotations per minute are to be indicated by said counter, of means connecting said member and counter to actuate the counter at a rate differing from the rate of rotation of said member, means including a slidable shaft, a plurality of gears thereon proportioned for any predetermined ratio of timed intervals during which the rotation is to be counted, locking means for maintaining said slidable shaft in any one of a plurality of positions corresponding to the sizes of the plurality of gears and to the neutral position of the mechanism, and means on said slidable shaft operating on the return to neutral from any of its positions, for stopping the operation of the counting device.

In testimony whereof I have signed my name to this specification, in the presence of two subscribing witnesses.

HENRY H. CUMMINGS.

Witnesses:
JAMES R. HODDER,
HAROLD J. CLARK.